United States Patent Office 3,483,276
Patented Dec. 9, 1969

3,483,276
BLENDS OF MODIFIED AND UNMODIFIED POLYPROPYLENE
Bert H. Mahlman, West Chester, Pa., assignor to Hercules Incorporated, Wilmington, Del., a corporation of Delaware
No Drawing. Filed Dec. 4, 1964, Ser. No. 416,119
Int. Cl. C08f *29/12*
U.S. Cl. 260—897
2 Claims

ABSTRACT OF THE DISCLOSURE

Blends of propylene polymer and maleic anhydride-modified propylene polymers are disclosed. These blends are shown to be excellent for coating metal.

---

This invention relates to blends of a propylene polymer with another propylene polymer which has been modified by chemical reaction with maleic anhydride.

The art is acquainted with a variety of polymers derived predominantly from propylene. In this specification the term "stereoregular polypropylene" is employed to connote solid, essentially crystalline polypropylene sometimes called isotactic polypropylene; the term "amorphous polypropylene" is employed to connote solid, essentially amorphous polypropylene sometimes called atactic polypropylene; and the term "propylene polymers" is inclusive of all polymers derived from propylene whether essentially amorphous or essentially crystalline, including copolymers, inclusive of block copolymers, of propylene with one or more other monomers.

The modified propylene polymers employed in the present invention are solid resinous polymeric materials containing about 0.05 to about 5%, and preferably about 0.5 to about 4%, chemically combined maleic anhydride, by weight of the polymer. Such modified polymers can be prepared by reacting maleic anhydride with any solid propylene polymer, either crystalline or amorphous, containing active centers or sites which are capable of anchoring the maleic anhydride thereon. The preferred propylene polymers from which the maleic anhydride-modified polymers are made for use in the invention are stereoregular polypropylene, amorphous polypropylene and copolymers of propylene and ethylene. These modified polymers desirably have a reduced specific viscosity of about 0.5 to 5, as measured in decahydronaphthalene at 135° C. Active centers at which anchoring will occur can readily be induced on the propylene polymers in known ways, as, for example, by subjecting the polymer to the action of high energy ionizing radiation such as gamma rays, X-rays, or high speed electrons; by contacting the polymer, either as a solid or a solution in a solvent, with a free radical-producing material such as dibenzoyl peroxide, dilauroyl peroxide, dicumyl peroxide, t-butyl perbenzoate; or by simply milling the polymer in the presence of air. Preferably, the modified propylene polymers are prepared by reacting maleic anhydride with a solution of the desired propylene polymer in an organic solvent containing a free radical-producing material, such method being described in Belgian Patent No. 607,269.

In accordance with the instant invention, it has been found that new and useful compositions can be prepared by blending a propylene polymer with a minor amount, preferably about 0.5 to 25% by weight based on the propylene polymer of a maleic anhydride-modified propylene polymer containing about .05 to 10% by weight of chemically combined maleic anhydride. Since the unmodified polymer is present in the predominant amount, these blends exhibit substantially the properties of the unmodified propylene polymer. However, due to the presence of the reactive sites provided by the maleic anhydride residues, of the modified polymer, the blends are much more amenable to the application of dyes, inks, and coating materials generally.

Thus, if the unmodified polymer is stereoregular polypropylene, the blend with a maleic anhydride-modified polymer will exhibit substantial crystallinity, high tensile strength, chemical inertness and abrasion resistance. If the starting unmodified polymer is amorphous polypropylene, the blend will also be substantially amorphous and will be a soft, flexible material which retains its plastic properties at relatively low temperatures. If the unmodified polymer is a copolymer of ethylene and propylene, the blend will be an amorphous, tough, rubbery material.

The preferred propylene polymer for use in the invention is stereoregular polypropylene. Blends of stereoregular polypropylene with maleic anhydride-modified stereoregular or amorphous polypropylene are useful in the formation of fibers, film, and other molded articles which are normally made from stereoregular polypropylene, whereby it is possible to take advantage of the dyeability and printability mentioned above.

But, it is in the field of metal coating that the blends of the instant invention find the widest application and greatest usefulness, Stereoregular polypropylene though it possesses properties which make it an excellent candidate for metal coating, has not been widely used in this application due to its poor adherence to metal.

In copending U.S. application Ser. No. 305,501, filed Aug. 29, 1963 and now abandoned by W. S. Ropp, it is disclosed that maleic anhydride - modified propylene polymers exhibit strong adhesion to metal and also to unmodified polypropylene. Accordingly, it is proposed in said copending application that the modified polypropylene be employed as an interlayer, or prime coat, between a metal substrate and a polypropylene topcoat. It his way, it has been found possible to form laminates of polypropylene and metal and to take advantage of the excellent surfacing properties of the polypropylene.

The blends of this invention also exhibit the quality of good adhesion to metal but no intermediate layer or prime coat is required. Since, as stated, the other properites of the blend are very little different from those of unmodified propylene polymer, it is thus possible to form laminates having virtually the same properties as those made according to the above copending application without the extra handling operations involved in the application of the interlayer. The economic advantage of the elimination of this step is easily seen.

In the case of the maleic anhydride-modified amorphous polypropylene and maleic anhydride-modified amorphous ethylene-propylene copolymer, there is a further advantage in that these amorphous materials have very good pigment dispersing, suspending, and binding properties. This property assists in uniformly coloring pigmented items prepared from the blends. Thus, pigmented coatings can readily be applied using the blends of this invention, and other articles, such as films, fibers, and molded items, can be more efficiently pigmented.

The method of incorporating the maleic anhydride-modified polymer into the propylene polymer can be varied according to the ultimate usage for which the blends are intended according to the equipment available, or according to the nature of the polymers. For example, if a film or fiber of stereoregular polypropylene is the intended end use, the modified polymer can be added to the unmodified material and blended in a compounding extruder and the blend extruded into molding powder pellets. It can also be incorporated by blending in, e.g., a three-roll mill or paint mixer. The maleic anhydride-modified amorphous polymers, being soluble in a number of common solvents at room temperature, can be incorporated by deposition from a solution, followed by extrusion. The blended material can then be fabricated by any of the known methods.

If the composition is intended for use as a metal coating, the modified and unmodified materials can be made up into either an organosol or a solution which is applied to the metal, freed of solvent, and baked at an appropriate temperature to fuse the polymers and bond them to the metal. An organosol is used in cases where either the modified or unmodified polymer is crystalline and thus insoluble at ordinary temperatures. This method has been found to form a sufficiently intimate mixture to yield very good coatings. If both polymers are amorphous, the solution method is employed.

The organosols or solutions can be applied to metal by any of the well-known techniques for applying coatings to substrata. Such techniques include brush application, spraying, and dipping.

The blends can also be applied to metal substrata by a lamination technique. A preformed film of the blend can be brought into contact with the metal and the bonding accomplished by means of heat and pressure. Alternatively, a molten film of the blend can be laid down directly upon the metal, as by extrusion and allowed to cool while maintaining good contact therewith. Upon cooling, the film of the polymer blend is found to be securely bonded to the substrate.

Flocking is yet another alternative method of applying the coating to metal. In this method an intimate dry blend of powdered polymers is dusted onto the surface to be coated, and thereafter heated to fuse the powder into an adhering film.

The use of the polymer blends of this invention in metal coating applications is demonstrated in the following examples. Parts and percentages are by weight in all cases unless otherwise specified.

Example 1

One hundred (100) parts of stereoregular polypropylene flake stabilized by addition thereto of 0.25% lauryl thiodipropionate and 0.5% of a butylated cresol-crotonaldehyde reaction product and having an average particle size of about 150 microns was milled for 40 hours in a xylene solution of 3.3 parts of amorphous polypropylene containing about 1.4% combined maleic anhydride to form an organosol. This composition was sprayed onto a phosphate-treated steel panel; the coating was baked for 7 minutes at 400° F. and then quenched in cold tap water. A second coat was applied and baked in identical manner. The total thickness of the coating thus applied was about 2 mils. Simultaneously, a control was prepared omitting the maleic anhydride-modified amorphous polymer. A test panel was coated with this material in the same manner.

The adhesion of the coatings was tested by cutting through the coating to the metal with a knife and peeling off the coating film with the knife blade. The blend of stereoregular polypropylene and maleic anhydride-modified amorphous polypropylene peeled only with difficulty, whereas the streoregular polypropylene coating peeled quite readily.

Examples 2–4

Other organosol compositions were prepared from the same maleic anhydride-modified amorphous polypropylene and stereoregular polypropylene having an average particle size of about 35 microns. These were prepared by stirring the particles into a xylene solution of the maleic anhydride-modified amorphous polypropylene employed in Example 1 and applied in the same manner as in Example 1. Adhesion characteristics of these compositions are shown in the following table.

TABLE 1

| Example No. | Composition | | | Adhesion |
| --- | --- | --- | --- | --- |
| | Stereoregular Polypropylene (pts. by wt.) | Xylene (pts. by wt.) | Modified Polypropylene (pts. by wt.) | |
| 2 | 30 | 100 | 0.3 | Fair. |
| 3 | 30 | 100 | 0.9 | Fair–Good. |
| 4 | 30 | 100 | 1.80 | Good. |

Adhesion was tested as in Example 1 and rated as follows: Poor—peels readily, no resistance; Fair—peels with some resistance; and Good—very difficult to peel.

Example 5

Fifteen (15) parts of a dispersion of maleic anhydride-modified stereoregular polypropylene containing about 1.6% combined maleic anhydride pebble milled in isopropanol at 10% solids was added to a dispersion containing 28.5 parts micronized stereoregular polypropylene stabilized by addition of 0.25% lauryl thiodipropionate and 0.5% crotonaldehyde-butylated cresol reaction product and having average particle size of 35 microns, 28.5 parts rutile $TiO_2$ pigment and 87 parts of xylene. The mix was thoroughly dispersed by vigorous stirring to form an organosol coating material.

Simultaneously, a control dispersion was prepared containing 30 parts of similarly stabilized stereoregular polypropylene, 28.5 parts rutile $TiO_2$ pigment and 87 parts xylene. This mix was also thoroughly dispersed by mixing.

Both of the above dispersions were spray applied to (a) phosphate treated and (b) cold rolled, solvent washed flat steel panels. Spraying was effected in two coats. The first coat was baked for 5 minutes at 400° F. and then quenched in cold tap water; the second coat was baked for 7 minutes at 400° F. and then quenched. Total thickness of the coating was 4 mils.

Adhesion was tested as in Example 1. The coatings containing the blend of crystalline polypropylene and maleic anhydride-modified crystalline polypropylene exhibited great resistance to peeling from either the phosphate treated or cold rolled steel while the coatings containing only the unmodified polypropylene peeled readily from either substrate.

Example 6

Twenty (20) parts of a 5% xylene solution of maleic anhydride-modified amorphous polypropylene containing about 1.4% combined maleic anhydride and 6 parts rutile $TiO_2$ was added to a solution of 5 parts amorphous polypropylene stabilized with 0.5% crotonaldehyde-butylated cresol reaction product and 0.25% lauryl thiodipropionate in 75 parts xylene. The mix was vigorously agitated to insure homogeneity of the solution and thorough dispersion of the pigment. This solution was spray applied onto a phosphate-treated steel panel and the coating was baked for seven minutes at about 400° F. A total coating thickness of 0.4 mils was applied. Simultaneously a control coating omitting the maleic anhydride-modified polymer was prepared and similarly applied.

The adhesion of the coating was tested as in Example 1. The coating containing the blend of amorphous polypropylene and maleic anhydride-modified polypropylene exhibited good adhesion to metal whereas the control coating peeled from the metal readily.

Example 7

Fifty (50) parts of an ethylene-propylene copolymer containing about 10% ethylene and stabilized with 0.5% crotonaldehyde-butylated cresol reaction product and 0.25% lauryl thiodipropionate was dry blended with 10 parts of maleic anhydride-modified stereoregular polypropylene containing about 1.6% combined maleic anhydride till uniform blending of the two polymers was obtained. This mixture was dusted onto the surface of a phosphate-treated steel panel and baked at 400° F. to fuse the mixture into a continuous film. Two coats were applied in this manner, yielding a total coating of about 5.5 mils. A control coating was applied simultaneously from which the maleic anhydride-modified polymer was omitted.

The coating containing the maleic anhydride-modified polymer exhibited good adhesion to the metal substrate, whereas the coating from which the maleic anhydride-modified polymer was omitted had very poor adhesion when tested by the method set forth in Example 1.

The polymer blends of this invention can also contain ingredients to modify other properties. Examples of such other ingredients are slip agents, plasticizers, stabilizers and the like. In particular, it is usually desirable to include a stabilizer in the compositions, as unstabilized polypropylene is otherwise subject to deterioration by heat and by light.

What I claim and desire to protect by Letters Patent is:

1. A polymer blend comprising about 75 to 99.5% of an essentially crystalline stereoregular propylene polymer containing at least 90% propylene units and about 25 to 0.5% maleic anhydride modified amorphous polypropylene containing about 0.05 to 5% combined maleic anhydride.

2. A polymer blend comprising about 75 to 99.5% of an essentially crystalline stereoregular propylene polymer containing at least 90% propylene units and about 25% to 0.5% of maleic anhydride modified stereoregular polypropylene containing about 0.05 to 5% combined maleic anhydride.

References Cited

UNITED STATES PATENTS

| | | | |
|---|---|---|---|
| 2,838,437 | 6/1958 | Busse et al. | 154—139 |
| 2,973,344 | 2/1961 | Fasce | 260—78.4 |
| 3,284,380 | 11/1960 | Davis | 260—8 |
| 2,662,874 | 12/1953 | Brown | 260—82.1 |

FOREIGN PATENTS

| | | |
|---|---|---|
| 1,268,469 | 6/1961 | France. |

SAMUEL H. BLECH, Primary Examiner

C. J. SECCURO, Assistant Examiner

U.S. Cl. X.R.

117—132; 260—33.4, 33.6, 41, 848, 876